(12) United States Patent
Yuet et al.

(10) Patent No.: US 9,110,467 B2
(45) Date of Patent: Aug. 18, 2015

(54) AUTOMATIC CONTROL OF A MARINE VESSEL DURING SPORT FISHING MODE

(75) Inventors: Fu P. Yuet, Simpsonville, SC (US); Merritt P. Callaghan, Simpsonville, SC (US); Justin Anderson, Racine, WI (US)

(73) Assignee: Caterpillar Inc., Peoria, IL (US)

( * ) Notice: Subject to any disclaimer, the term of this patent is extended or adjusted under 35 U.S.C. 154(b) by 274 days.

(21) Appl. No.: 13/616,089

(22) Filed: Sep. 14, 2012

(65) Prior Publication Data
US 2014/0081489 A1    Mar. 20, 2014

(51) Int. Cl.
*G05D 1/00* (2006.01)
*G05D 1/02* (2006.01)

(52) U.S. Cl.
CPC ............... *G05D 1/00* (2013.01); *G05D 1/0206* (2013.01)

(58) Field of Classification Search
None
See application file for complete search history.

(56) References Cited

U.S. PATENT DOCUMENTS

| 5,050,519 | A  | * | 9/1991  | Senften .................. 114/144 E |
| 5,884,213 | A  | * | 3/1999  | Carlson ........................ 701/21 |
| 7,447,112 | B2 | * | 11/2008 | Steimel ........................ 367/13 |
| 8,099,200 | B2 | * | 1/2012  | Coombs ......................... 701/4 |
| 8,305,844 | B2 | * | 11/2012 | Depasqua .................... 367/107 |
| 8,626,365 | B2 | * | 1/2014  | Shimo et al. ................. 701/21 |
| 8,647,161 | B2 | * | 2/2014  | Leblanc ......................... 440/1 |
| 2009/0197486 | A1 | | 8/2009 | Szilagyi et al. |

FOREIGN PATENT DOCUMENTS

JP    01250876 A  * 10/1989    ................ G01S 7/62

* cited by examiner

*Primary Examiner* — Redhwan k Mawari
*Assistant Examiner* — Edward Torchinsky
(74) *Attorney, Agent, or Firm* — Glenn Waterfield; BakerHostetler

(57) ABSTRACT

The disclosure relates to a marine vessel having a control system for automatically steering the marine vessel for the purpose of aiding an angler who has hooked a fish. The control system includes a GPS unit for determining the orientation of the marine vessel, a sonar unit for determining the bearing of a fish, and an algorithm for minimizing the error between the two. The control system will execute steering commands in the propulsion system in order to minimize the error in order to aid the angler as he tries to land the hooked fish.

33 Claims, 5 Drawing Sheets

AUTOMATIC CONTROL OF A MARINE VESSEL DURING SPORT FISHING MODE

TECHNICAL FIELD

This disclosure relates to automatically controlling a marine vessel in sport fishing applications.

BACKGROUND

Sport fishing often involves a fisherman, or "angler", using a rod and reel to catch a fish. The angler often fishes from a marine vessel in order to reach a favorable fishing location. When the angler has hooked a substantial fish, it can take a significant amount of effort by the entire crew to catch and bring aboard the fish. The angler engages in a tug-of-war with the fish as it changes location relative to the marine vessel. The operator of the boat must then maneuver the stern of the vessel so that it is oriented toward the fish in order to aid the angler as the fish moves. Typically such a vessel is equipped with special levers, known as "Palm Beach levers", for steering the vessel during sport fishing maneuvers. These levers are located at the operator's station and are designed to be manipulated by the operator who faces the stern of the vessel while manipulating the levers behind him. This manner of maneuvering is hard to master and requires a skilled operator.

SUMMARY OF THE INVENTION

A method for aiding an angler by automatically steering a marine vessel is proposed. The method comprises receiving a signal in an electronic controller corresponding to an orientation of the marine vessel, receiving a signal in the electronic controller corresponding to an angle of a fish relative to the marine vessel, calculating an error in the electronic controller between the orientation of the marine vessel and the angle of the fish relative to the marine vessel, generating steering commands in the electronic controller, and executing the steering commands in a marine propulsion system such that the error is minimized.

In another aspect, a control system for aiding an angler by automatically steering a marine vessel is proposed. The control system comprises an electronic controller configured to receive a signal corresponding to an orientation of a marine vessel, receive a signal corresponding to an angle of a fish relative to the marine vessel, calculate an error between the orientation of the marine vessel and the angle of the fish relative to the marine vessel, generates steering commands, and a marine propulsion system for executing the steering commands such that the error is minimized.

In yet another aspect, a marine vessel having a control system is proposed. The marine vessel comprises an electronic controller configured to receive a signal corresponding to an orientation of a marine vessel, receive a signal corresponding to an angle of a fish relative to the marine vessel calculate an error between the orientation of the marine vessel and the angle of the fish relative to the marine vessel, generate steering commands, and a marine propulsion system for executing the steering commands such that the error is minimized.

DETAILED DESCRIPTION

Figure 1:
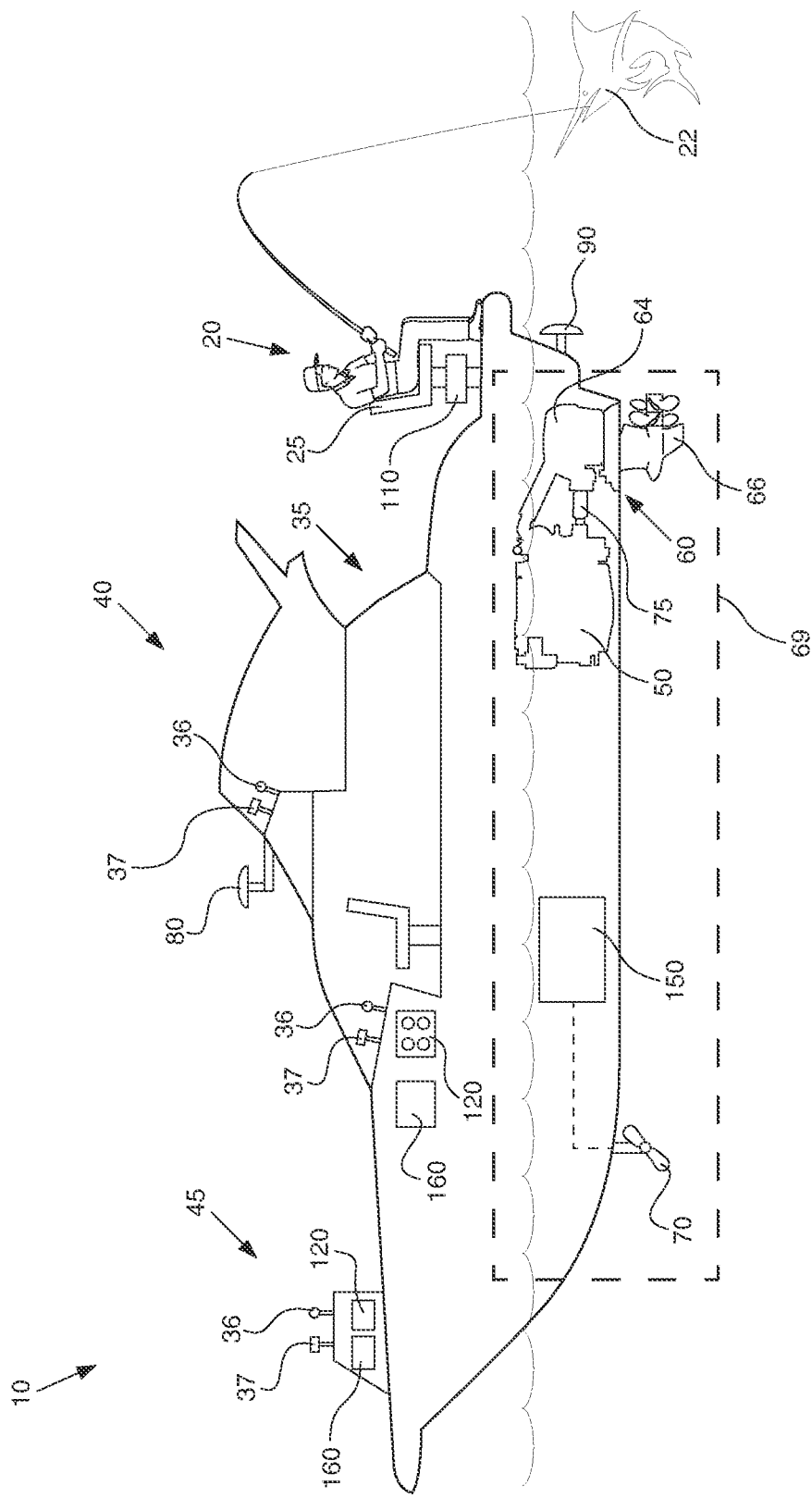
FIG. 1 shows a marine vessel and several major components according to the present disclosure

FIG. 1 shows the major mechanical components of a marine vessel 10 according to the present disclosure. The marine vessel 10 includes an operator's station 35 where the major controls of the vessel are located. Such controls include control levers 36, a joystick 37, a keypad 120, and a display 160. Some or all of the controls may also be located at redundant locations such as a fly bridge 40 or a remote operator's station 45. The marine vessel 10 also includes a marine propulsion system 69. The marine propulsion system 69 includes, at least in part, an engine 50, a pod 60, and electronic controllers such as master controller 150. The marine propulsion system 69 may also include a bow thruster 70 and/or a stern thruster 71 (not shown). The bow thruster 70 and stern thruster 71 are typically electrically driven by a controller, such as master controller 150. They could also be powered by a hydraulic system as is known in the art (not shown). The engine 50 drives a pod 60 through a driveshaft 75. The pod 60, also known as an azimuth thruster, contains gearing, steering, and propulsion functions. The pod is made up of two units. The first, the pod upper unit 64, connects to the engine 50 via the driveshaft 75 and contains the gearing and steering functions. The second, the pod lower unit 66, mounts a propeller and provides an exhaust outlet for engine 50. The pod lower unit 66 is external of the hull of the marine vessel 10 and rotates to provide steering.

The marine vessel 10 in FIG. 1 could contain a number of propulsion units 68 depending on the application. A propulsion unit 68 as described in this disclosure includes an engine 50 and a pod 60 along with the associated controllers 130, 140 and other components required for the function of the propulsion unit 68. For instance, the marine vessel 10 in FIG. 1 could contain two propulsion units or four propulsion units and so on.

The marine vessel 10 contains at least one operator's station 35 that contains the helm and other functions of the vessel. The operator's station 35 includes a set of control levers 36 that provide input for steering and propulsion functions. A joystick 37 is also included that provides fine steering and propulsion functions. A keypad 120 provides keys or buttons or switches for various functions of the marine vessel 10. Such functions could include engine start, engine mode, fuel system controls, lighting, fire suppression, HVAC, radio, blowers, anchor, bilge pump, generator control, external power, etc. The functions of the keypad 120 could also be fulfilled by a touch screen display or other input device known in the art. The operator's station 35 also includes a display 160 that shows that status of the various functions of the marine vessel 10. Such functions could include engine status, engine mode, navigation, sonar, etc. The functions of the display 160 could also be fulfilled by a touch screen display. It is also conceived that functions of the keypad 120 and display 160 could be combined into a touch screen display.

The marine vessel 10 may also have more than one operator's station. For instance, a redundant set of controls could be located on a fly bridge. The function of the fly bridge 40 is to give a view advantageous for navigation or pleasure viewing. Another set of controls could be located at a remote operator's station 45. The function of the remote operator's station 45 could be to give a view advantageous for docking maneuvers.

The fly bridge 40 or remote operator's station 45 could therefore have at least one of a set of control levers 36, joystick 37, keypad 120, or display 160.

A GPS unit 80 is mounted to the marine vessel 10 in such a way as to receive satellite information. The GPS unit 80 consists of a receiver and any hardware needed to provide necessary location information. The GPS unit 80 is configured to provide location, heading (or orientation), and velocity information. The GPS unit 80 may provide an analog output or may be configured to provide a message containing location information onto a control area network (CAN). The GPS unit 80 according to this disclosure could be configured to work with the GPS, GLONASS, or other satellite location system.

Similarly, a sonar unit 90 is mounted to the marine vessel 10 in such a way as to provide location of an underwater target, e.g. a fish 22. The sonar unit 90 is configured to provide distance and bearing of the fish 22. The sonar unit 90 may provide an analog output or may be configured to provide a message containing target information onto a control area network (CAN).

A fisherman, or angler 20, typically fishes from the deck at the stern of the marine vessel 10. Typical angling equipment includes a rod and reel. The reel includes a fishing line with an angled hook at the end for holding bait and hooking a fish 22. The angler 20 may fish from either a seated or standing position. If a substantial fish 22 is hooked, the angler 20 can experience considerable force as the angler 20 is pulled in the direction of the fish 22. If the angler 20 is seated then the forces from the fish 22 are transmitted into the angler's seat 25.

An angler's seat 25 may be located on the stern of the marine vessel 10. The seat 25 is attached to the deck by a seat support 26. The seat 25 may be a single column or multiple legs as is known in the art. A load cell 110, such as a strain gage ring, is attached to the seat support in a manner such that forces on the angler 20 seated on the seat 25 are transmitted to the support 26 and are detected by the load cell. An example of a suitable load cell 110 is a TS Load Cell sold by MAGPOWR of Oklahoma City, Okla. A strain gage ring is capable of detecting a force in any direction along the horizontal plain. The load cell 110 is therefore capable of sensing forces applied by a hooked fish 22 to an angler 20, and on to the angler's seat 25. The output from the load cell 110 is passed to a controller, such as the master controller 150. The controller is capable of discerning natural movement of the angler 20 versus movement of the angler 20 when a fish 22 has been hooked. For instance, natural movement of the angler 20 would be indicated by small forces in rapidly changing directions as the angler 20 shifts position in the angler's seat 25. In contrast, the movement of the angler when a fish 22 has been hooked would be indicated by larger forces that change direction less rapidly. The controller is able use this information to determine whether the angler 20 is engaged with a fish 22 or not.

Figure 2:
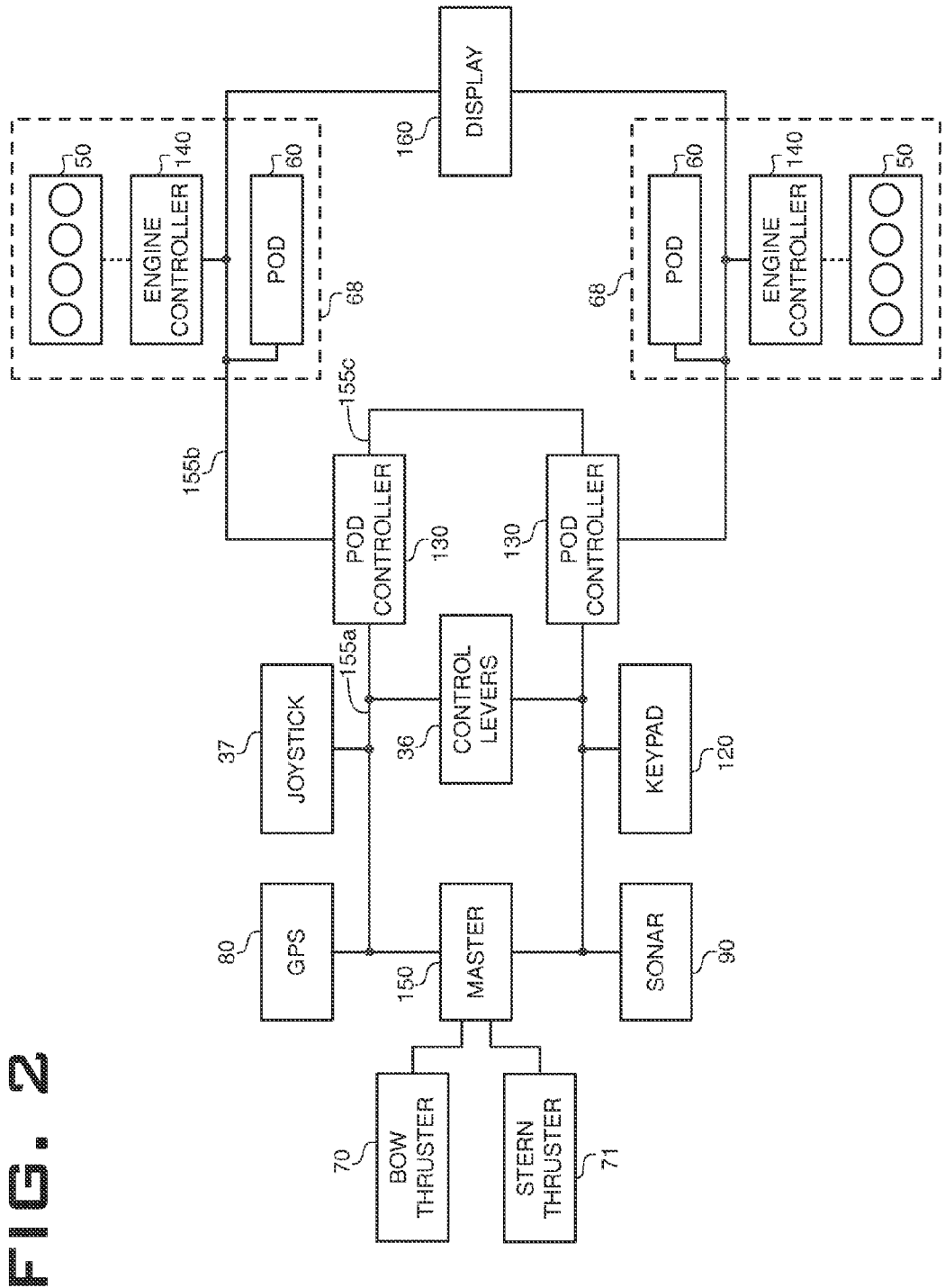
FIG. 2 shows a control system according the present disclosure

FIG. 2 shows a diagrammatic view of a control system according to the present disclosure. A master controller 150 is connected via a control area network (CAN) 155a. The CAN is of the type that is commonly known in the art, such as J1939. The master controller 150 is connected via CAN 155a to the pod controller 130. Control levers 36, joystick 37, and keypad 120 are also connected to CAN 155a. These devices are configured to generate messages on the CAN 155a corresponding to their inputs. GPS unit 80 may also connected to CAN 155a. The GPS unit 80 is configured to deliver messages corresponding to location and orientation information to master controller 150. The GPS unit 80 could also be connected to master controller 150 via an analog or digital connection in order to provide the same information.

The sonar unit 90 may be connected to CAN 155a or it may be connected to master controller 150 via an analog or digital connection. The sonar unit 90 is configured to deliver information regarding range and bearing information of a target fish 22.

Given the input from the GPS unit 80 and the sonar unit 90, the master controller 150 can compare the orientation of the marine vessel 10 to the bearing of the fish 22.

A bow thruster 70 or a stern thruster 71 is optional and can be included as the application requires. The bow thruster 70 and stern thruster 71 are typically electrically driven by a controller, such as master controller 150. They could also be powered by a hydraulic system as is known in the art (not shown).

Figure 3:
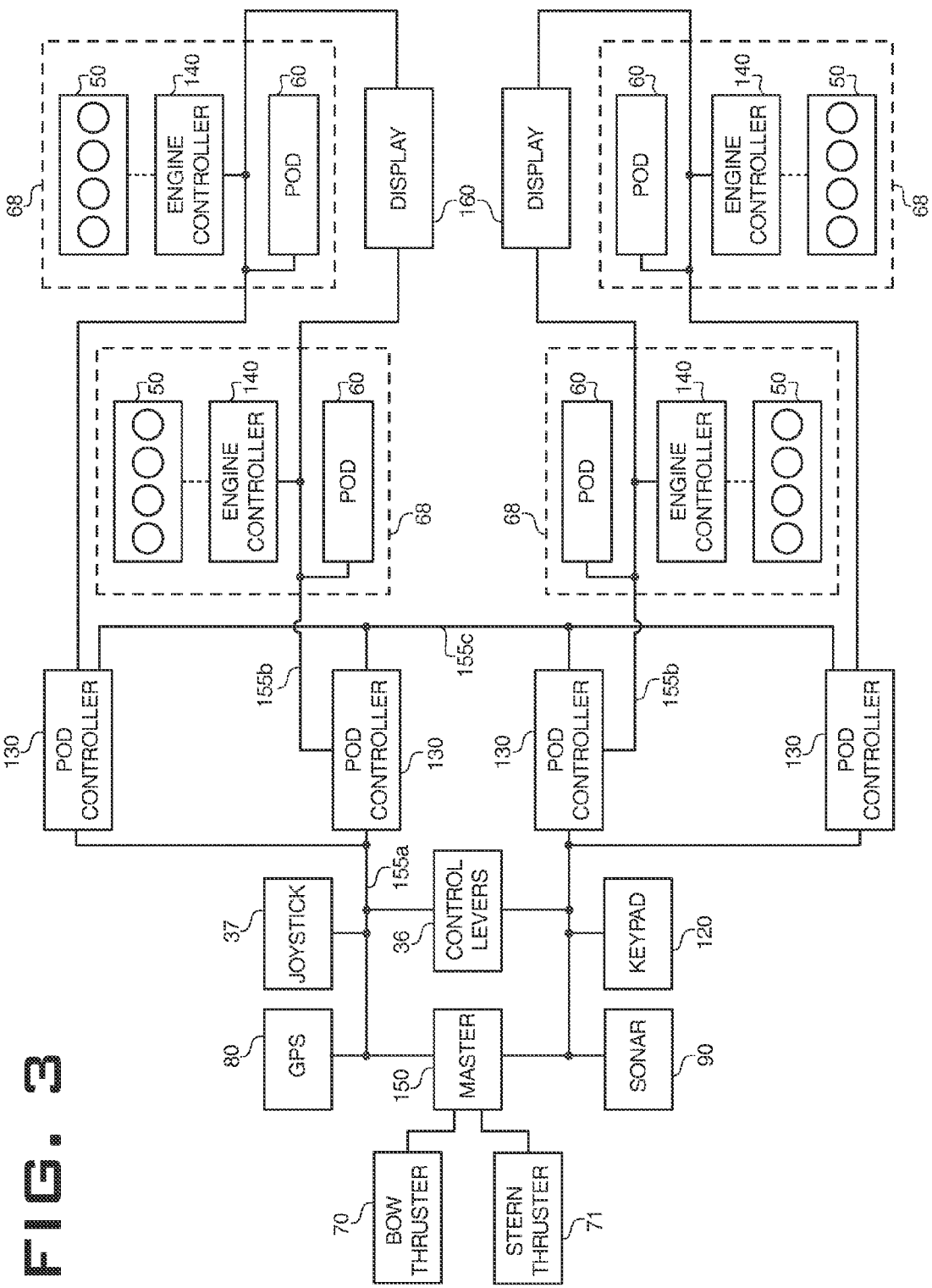
FIG. 3 shows a control system with additional components according to the present disclosure

The control system in FIG. 2 shows two propulsion units 68. A propulsion unit 68 as described in this disclosure includes an engine 50 and a pod 60 along with the associated controllers 130, 140 and other components required for the function of the propulsion unit 68. It is also conceived within the scope of this disclosure that other propulsion units 68 could be added to the control system. For instance, the control system in FIG. 3 shows a control system including four propulsion units 68. Any number of propulsion units 68 can be included by adding the appropriate CAN connections and components.

The pod controller 130 is connected to pod 60 and an engine controller 140 via a control area network (CAN) 155b. The pod controller 130 communicates with and issues steering and gear change commands to the pod 60. The pod controller 130 also communicates with and issues commands to the engine controller 140. Commands could include such parameters as speed, torque, start/stop, etc. Multiple pod controllers 130 may be linked by a separate control area network (CAN) 155c.

Figure 4:
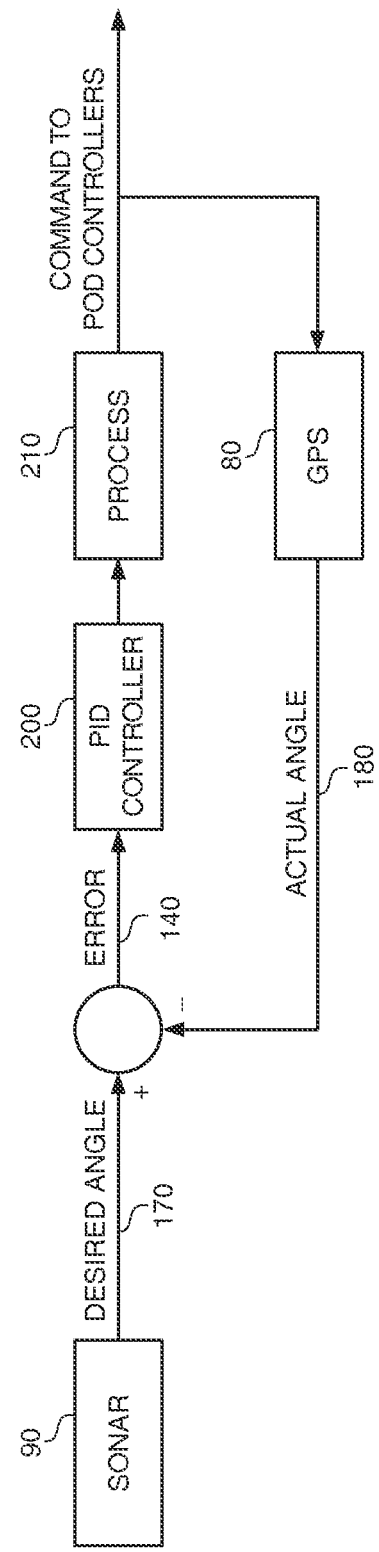
FIG. 4 shows a control algorithm according the present disclosure

FIG. 4 shows a general depiction of a PID control algorithm according the present disclosure. The PID control algorithm is executed in a controller, such as master controller 150. The bearing of the target fish 22 from sonar unit 90 serves as the input desired angle 170. Orientation of the marine vessel 10 from the GPS unit 80 serves as the measured angle 180. The difference between 170 and 180 is defined as the angle error 190 which is fed into the PID control 200. The PID controller contains any or all of a proportional, integral, or derivative term as is well known in the art. The output of the PID control 200 then serves as input to the process 210, which represents the dynamics of the steering and propulsion systems and interactions of the marine vessel 10. The output of process 210 serves as the appropriate commands to the pod controllers 130.

Figure 5:
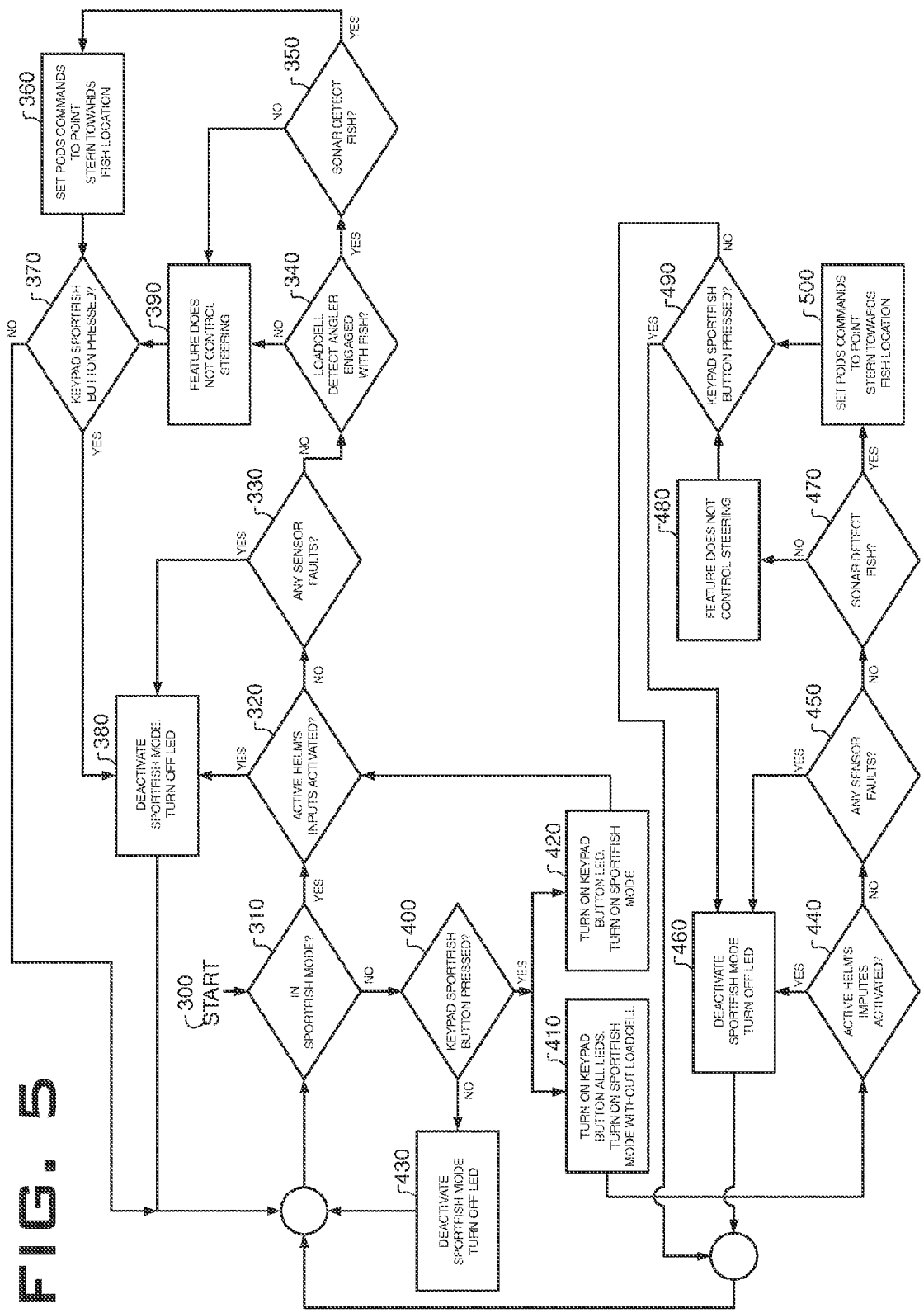
FIG. 5 shows a flowchart according the present disclosure

FIG. 5 depicts an example of a method of implementing the control system in the present disclosure. The method begins at box 300. The method moves next to decision box 310. If YES at 310 the method moves to decision box 320. If NO at 310 the method moves to decision box 400. If YES at 320 the method moves to action box 380 where Sportfish Mode is deactivated. The method then returns to decision box 310. If NO at 320 then the method moves to decision box 330. If YES at 330 the method moves to action box 380. The method moves from 380 to decision box 310. If NO at 330 the method moves to decision box 340. If YES at 340 the method moves to decision box 350. If NO at 340 the method moves to action box 390. If YES at 350 the method moves to action box 360 where automatic control of the marine vessel 10 is executed. The method moves from 360 to decision box 370. If NO at 350 the method moves to action box 390. The method moves from action box 390 to decision box 370.

If YES at 400 the method moves to either of action boxes 410 and 420, depending on how long the keypad button is pressed. If the key at 400 is pressed for less than 2 seconds, the method moves to 420, where Sportfish Mode is enabled. If the key at 400 is pressed for more than 2 seconds, the method moves to 410 where Sportfish Mode is enabled without load cell 110 functionality. The method moves from 420 to decision box 320.

The method moves from 410 to decision box 440. If YES at 440 the method moves to action box 460. If NO at 440 the method moves to decision box 450. If YES at 450 the method moves to 460. If YES at 450 the method moves to action box 460. If NO at 450 the method moves to decision box 470. If YES at 470 the method moves to action box 500 where automatic control of the marine vessel 10 is executed. The method moves from 500 to decision box 490. If NO at 470 the method moves from action box 480. The method moves from 480 to 490. If YES at 490 the method moves to 460. If NO at 490 the method moves to 310.

INDUSTRIAL APPLICABILITY

The present disclosure relates to a method and control system for steering a marine vessel 10. The marine vessel 10 is a vessel that is specially equipped for sport fishing, or angling. The vessel is equipped with a GPS unit 80 for navigation and a sonar unit 90 for detecting a target fish 22. The marine vessel 10 includes a small crew, including a captain, in addition to the angler 20. The captain of the ship often serves as the operator of the marine vessel 10. The captain operates the vessel from the helm while the angler 20 is typically located at the stern of the marine vessel 10.

The operator will typically operate the marine vessel 10 in a low speed cruise mode while the angler 20 is actively fishing. The operator will then push a sportfishing mode key on the keypad 120 in order to enable a special sportfishing mode. When the key is pressed for 100 ms, an LED next to the key (or backlighting the key) will turn on indicating that that the sportfishing mode is active. Pressing the key for 100 ms while the sportfishing mode is active will deactivate the sportfishing mode. The sportfishing mode will also be deactivated if the operator moves any of the helm controls or if communication between the master controller 150 and the keypad 120 is lost.

Once the sporfishing mode is active, the controllers 130, 140, or 150 may check to determine whether any sensor faults are active. If any faults are active, the sportfishing mode will be deactivated.

Pressing the sportfishing mode key for 2 seconds will also activate the sportfishing mode feature but without regard to the signal from the load cell 110 on the angler's seat 25. This allows the sportfishing mode to operate without requiring the angler 20 to stay seated. In this way, the angler 20 is free to move about the stern of the marine vessel 10 while still benefiting from the automatic steering of the sportfishing mode.

When all the requirements are met, the automatic sportfishing mode will engage and take command of the marine propulsion system 69. The master controller receives data regarding the orientation of the marine vessel 10 from the GPS unit 80. The master controller receives data regarding the bearing of the target fish 22 from the sonar unit 90. The angle error 190 between the two is calculated and then enters into a PID control 200. Commands to the marine propulsion system 69 are executed such that angle error 190 is minimized. For example, suppose that the GPS unit 80 indicates that the stern of the marine vessel 10 is oriented toward a compass reading of 0 degrees. Suppose also that the sonar unit 90 indicates that a target fish 22 is located at a compass reading of 20 degrees. The master controller 150 calculates the error as 20 degrees and issues commands to the rest of the marine propulsion system 69 to cause the stern of the marine vessel 10 to point at the target fish 22.

The pods 60 in the marine propulsion system 69 work together in order to increase the steering response of the marine vessel 10. For instance, a two pod system may have each pod 60 thrusting in opposite directions during sportfishing mode. The pods 60 could also thrust in the same direction in order to combine their thrust. The marine propulsion system 69 can also include a bow thruster 70 or a stern thruster 71 that can include propulsion and steering in addition to the pods 60.

The parameters of the PID control 200 are set as is known in the art. The proportional term is set to be the amount of correction as needed at the time the error is measured and can be tuned as needed. The integral term is the sum of the error over time, while the derivative term is the prediction of future error based on the current rate of change.

What is claimed is:

1. A method for aiding an angler by automatically steering a marine vessel, comprising:
   receiving a signal in an electronic controller corresponding to an orientation of said marine vessel;
   receiving a signal in said electronic controller corresponding to an angle of a fish relative to said marine vessel;
   receiving a signal in said electronic controller corresponding to a force applied by said fish to said marine vessel;
   determining whether said angler is engaged with said fish by said electronic controller based on said force applied by said fish;
   calculating an error in said electronic controller between the orientation of the marine vessel and the angle of the fish relative to said marine vessel;
   generating steering commands in said electronic controller based on whether said angler is engaged with said fish, the calculated error, and the force applied by said fish; and
   executing said steering commands in a marine propulsion system such that the error is minimized.

2. The method of claim 1 further including the step of receiving a signal corresponding to movement of said angler in said electronic controller.

3. The method of claim 1 wherein the signal corresponding to the orientation of said marine vessel is sent by a global position unit.

4. The method of claim 1 wherein the signal corresponding to the angle of the fish relative to said marine vessel is sent by a sonar unit.

5. The method of claim 1 wherein the signal corresponding to the orientation of said marine vessel is sent by a global position unit, and
   the signal corresponding to the angle of the fish relative to said marine vessel is sent by a sonar unit.

6. The method of claim 1 wherein the marine propulsion system includes at least two propulsion units.

7. The method of claim 1 wherein the marine propulsion system includes at least one thruster unit.

8. The method of claim 1 wherein the marine propulsion system includes at least two propulsion units and at least one thruster unit.

9. The method of claim 1 wherein the electronic controller is further configured to receive a signal corresponding to a force of said angler, wherein the force applied by said fish is applied to said angler.

10. The method of claim 2 wherein the movement signal is sent by a load cell operably connected to an angler's seat.

11. A control system for aiding an angler by automatically steering a marine vessel, comprising:
an electronic controller configured to
receive a signal corresponding to an orientation of a marine vessel;
receive a signal corresponding to an angle of a fish relative to said marine vessel;
receive a signal corresponding to a force applied by said fish;
determine whether said angler is engaged with said fish based on said force applied by said fish;
calculate an error between the orientation of the marine vessel and the angle of the fish relative to said marine vessel;
generate steering commands based on whether said angler is engaged with said fish, the calculated error, and the force applied by said fish; and
a marine propulsion system for executing said steering commands such that the error is minimized.

12. The control system of claim 11 wherein the electronic controller is further configured to receive a signal corresponding to movement of said angler.

13. The control system of claim 11 wherein the signal corresponding to the orientation of said marine vessel is sent by a global position unit.

14. The control system of claim 11 wherein the signal corresponding to the angle of the fish relative to said marine vessel is sent by a sonar unit.

15. The control system of claim 11 wherein the signal corresponding to the orientation of said marine vessel is sent by a global position unit; and
the signal corresponding to the angle of the fish relative to said marine vessel is sent by a sonar unit.

16. The control system of claim 11 wherein the marine propulsion system includes at least two propulsion units.

17. The control system of claim 11 wherein the marine propulsion system includes at least one thruster unit.

18. The control system of claim 11 wherein the marine propulsion system includes at least two propulsion units and at least one thruster unit.

19. The control system of claim 11 wherein said control system is enabled by a control located at an operator station of said marine vessel.

20. The control system of claim 11 wherein the electronic controller is further configured to receive a signal corresponding to a force of said angler, wherein the force applied by said fish is applied to said angler.

21. The control system of claim 12 wherein the movement signal is sent by a load cell operably connected to an angler's seat.

22. The control system of claim 11 wherein said control system is enabled by any of at least two controls located at different operator stations on said marine vessel.

23. A marine vessel comprising:
an electronic controller configured to
receive a signal corresponding to an orientation of a marine vessel;
receive a signal corresponding to an angle of a fish relative to said marine vessel;
receive a signal corresponding to a force applied by said fish;
determine whether said angler is engaged with said fish based on said force applied by said fish;
calculate an error between the orientation of the marine vessel and the angle of the fish relative to said marine vessel;
generate steering commands based on whether said angler is engaged with said fish, the calculated error, and the force applied by said fish; and
a marine propulsion system for executing said steering commands such that the error is minimized.

24. The marine vessel of claim 23 wherein the electronic controller is further configured to receive a signal corresponding to movement of said angler.

25. The marine vessel of claim 24 wherein the movement signal is sent by a load cell operably connected to an angler's seat.

26. The marine vessel of claim 23 wherein the signal corresponding to the orientation of said marine vessel is sent by a global position unit.

27. The marine vessel of claim 23 wherein the signal corresponding to the angle of the fish relative to said marine vessel is sent by a sonar unit.

28. The marine vessel of claim 23 wherein the signal corresponding to the orientation of said marine vessel is sent by a global position unit; and
the signal corresponding to the angle of the fish relative to said marine vessel is sent by a sonar unit.

29. The marine vessel of claim 23 wherein the marine propulsion system includes at least two propulsion units.

30. The marine vessel of claim 23 wherein the marine propulsion system includes at least one thruster unit.

31. The marine vessel of claim 23 wherein the marine propulsion system includes at least two propulsion units and at least one thruster unit.

32. The marine vessel of claim 23 wherein the control system is enabled by a control located at an operator station of said marine vessel.

33. The marine vessel of claim 23 wherein the control system is enabled by any of at least two controls located at different operator stations on said marine vessel.

* * * * *